No. 677,415. Patented July 2, 1901.
W. G. KENDALL.
CUSHION TIRE.
(Application filed Nov. 6, 1900.)
(No Model.)

Witnesses
Inventor
W. G. Kendall
By J. R. Nottingham Attorney

UNITED STATES PATENT OFFICE.

WEBBER G. KENDALL, OF PROVIDENCE, RHODE ISLAND.

CUSHION-TIRE.

SPECIFICATION forming part of Letters Patent No. 677,415, dated July 2, 1901.

Application filed November 6, 1900. Serial No. 35,626. (No model.)

*To all whom it may concern:*

Be it known that I, WEBBER G. KENDALL, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to that class of vehicle-tires generally styled "cushion-tires;" and it consists, essentially, of a tire constructed from a sheet or blank of tire-forming fabric curled or rolled in the form of a convolute, each convolution being spaced apart from the next adjacent one, forming air-chambers.

The invention further consists of the particular means for spacing apart the convolutions.

The object of the invention is to produce a cushion-tire that will be sufficiently elastic to render riding smooth and easy and strong enough to withstand the sudden shocks and jars to which it may be subjected.

Other objects will become apparent upon further description of the invention.

Figure 1:
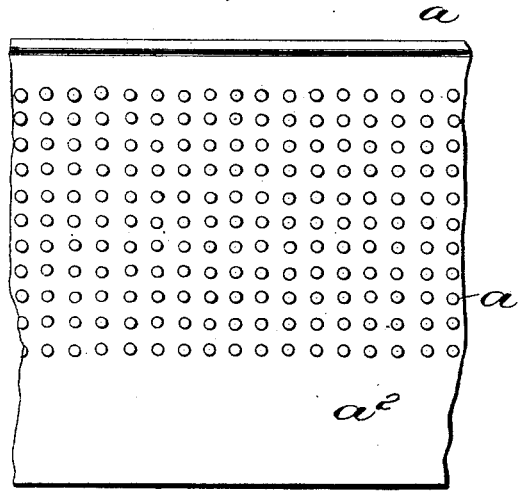
Figure 4:
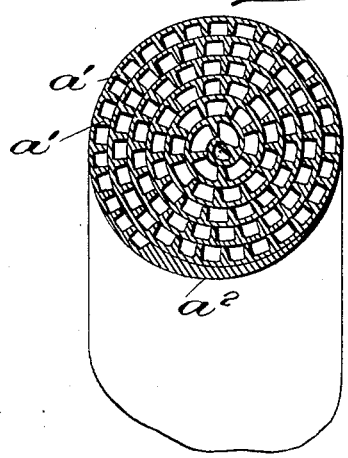
Figure 3:
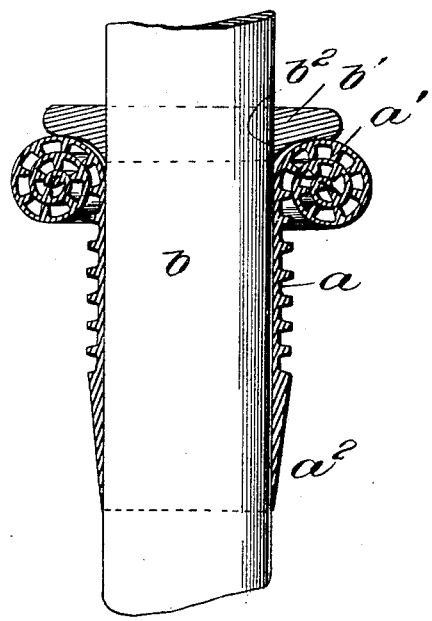
Figure 2:
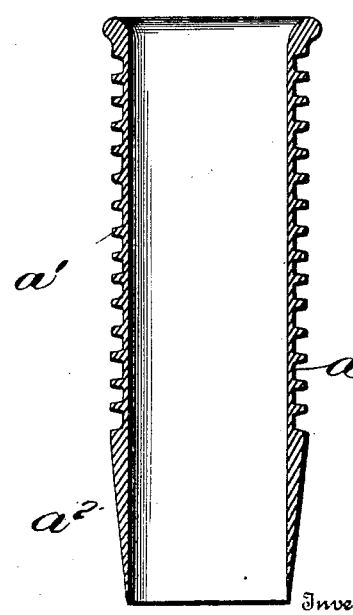

In the accompanying drawings, Figure 1 is a plan view of the strip or blank from which my improved tire is constructed, the same being the preferred form; Fig. 2, a partly-sectional view of the cylinder formed from the strip or blank; Fig. 3, a vertical section showing the manner of curling or rolling the cylinder to form the tire, and Fig. 4 a section of the tire complete.

Referring to the several views, the letter $a$ indicates a strip or blank of any suitable tire-forming material, preferably rubber, of a width sufficient to form a cylinder of the required diameter. The strip or blank has one of its surfaces partly provided or formed with studs or projections $a'$, the remaining portion of the surface being plain or smooth, as shown.

In forming the tire I prefer to first form the strip or blank into a cylinder, as shown in Fig. 2, by uniting the side edges together by any suitable and well-known means. The cylinder thus formed is placed on a tubular mandrel $b$, and a follower $b'$, having a flange $b^2$, employed to curl or roll the tube into an endless ring, convolute in cross-section. In curling or rolling the cylinder the flange is inserted between the outer surface of the mandrel and the inner or smooth surface of the cylinder, so that when pressure is applied to the follower the end of the cylinder will be caused to curl or roll over upon itself, and as the pressure is continued the curling or rolling process goes on until the tire is completed. To facilitate the curling or rolling process, the diameter of the mandrel should be sufficiently greater than that of the cylinder so as to slightly expand the latter when placed on the mandrel. When the curling or rolling is completed, the portion $a^2$ of the strip or blank will form the cover of the tire. After the strip or blank has been formed into the cylinder and before the curling or rolling process takes place the ends of the studs or projections are coated with some adhesive substance, such as cement, so that in curling or rolling the cylinder the said studs or projections will be caused to adhere to the smooth or opposite surface of the strip or blank, or the cylinder may be slightly cooked or vulcanized to cause the ends of the studs or projections to adhere to said surface in curling or rolling the cylinder. When the tire is completed, it is properly vulcanized, or if it has been slightly vulcanized to cause the ends of the studs or projections to adhere to the smooth surface of the strip or blank it is then finished.

I do not wish to be understood as limiting myself to any particular method of forming the tire from the blank, as it may be formed without first forming the strip or blank into the cylinder. The forming of the tire into a convolute in cross-section may be accomplished by simply rolling the strip or blank into a straight roll and then joining together the ends in any well-known manner. Neither do I wish to be understood as limiting myself to forming the tire from a strip or blank having one of its surfaces only partly provided with the studs or projections, as the entire surface may be provided with said studs or projections, and when curled or rolled into convolute form a suitable cover may be provided, and the object of my invention be accomplished without changing the spirit of the invention or sacrificing its principle.

It will be seen that each convolution is separated from the next adjacent one by the independent studs or projections forming air-chambers the entire length of the tire, giving to the tire a cushioning effect that greatly enhances its riding qualities, and the studs or projections, supporting each convolution separately from another, tend to impart to the tire a stableness that is found lacking in many tires of this class.

This form of tire is especially designed for wheels having grooved or channeled rims. Any suitable means may be employed to secure it on the wheel.

When the tire is to be applied to heavy wheels, I prefer to provide a strip or blank with a backing of canvas, so as to impart to the tire the additional strength required for wheels of this type.

Having thus fully described my invention, what I claim, and desire to secure by Letters Patent, is—

1. A cushion-tire, comprising a fabric formed into a convolute, each convolution thereof being spaced from the next adjacent one by means of single or individual supports.

2. A cushion-tire, comprising a fabric, provided with individual projecting supports, formed into a convolute, each convolution being spaced apart from another by said supports, forming air-chambers.

3. A cushion-tire, comprising a fabric, having one of its surfaces partially provided with individual projections, formed into a convolute, each convolution spaced apart from another by said projections, and a cover for the tire integral with the fabric.

4. A cushion-tire, comprising a strip or blank of tire-forming material having one of its surfaces provided with individual projections, said strip or blank curled or rolled to form a convolute each convolution being spaced apart by said projections, forming air-chambers.

5. A cushion-tire, comprising a strip or blank of tire-forming fabric having one of its surfaces provided with individual projections, said strip or blank curled or rolled to form a convolute, each convolution being spaced apart by said projections, forming air-chambers, and an outer covering.

6. A cushion-tire, comprising a strip or blank of rubber, having one of its surfaces provided with individual projections, said strip or blank curled or rolled in convolute form, each convolution being spaced apart by said projections, forming air-chambers, and an outer covering.

7. A cushion-tire, comprising a strip or blank of rubber having one of its surfaces partly provided with individual projections, said strip or blank curled or rolled in a convolute, each convolution being spaced apart by said projections, forming air-chambers, and a covering integral with the strip or blank.

8. A cushion-tire, comprising a tire-forming fabric formed into a convolute, individual projections for spacing apart the convolutions to form air-chambers, said individual projections being positively secured to each convolution spaced thereby.

In testimony whereof I affix my signature in the presence of two witnesses.

WEBBER G. KENDALL.

Witnesses:
F. T. F. JOHNSON,
J. R. NOTTINGHAM.